United States Patent [19]
Sato et al.

[11] Patent Number: 5,548,093
[45] Date of Patent: Aug. 20, 1996

[54] LOW NOISE HOSE

[75] Inventors: Jyunichi Sato, Kuwana; Takahiro Komori, Inazawa, both of Japan

[73] Assignee: Toyoda Gosei Co., Ltd., Nakashima-gun, Japan

[21] Appl. No.: 235,322

[22] Filed: Apr. 29, 1994

[30] Foreign Application Priority Data

Aug. 20, 1993 [JP] Japan ................. 5-228209

[51] Int. Cl.$^6$ ................................ E04F 17/04
[52] U.S. Cl. ............................ 181/224; 138/121
[58] Field of Search .................... 181/224, 227, 181/228, 246, 252, 282; 138/114, 121, 148

[56] References Cited

U.S. PATENT DOCUMENTS

| | | |
|---|---|---|
| 3,903,928 | 9/1975 | Sykes et al. ............... 138/148 |
| 4,315,558 | 2/1982 | Katayama ................. 181/227 |
| 4,993,513 | 2/1991 | Inoue et al. ............... 181/282 |
| 5,092,122 | 3/1992 | Bainbridge ................ 181/252 |

FOREIGN PATENT DOCUMENTS

| | | |
|---|---|---|
| 318636 | 11/1992 | European Pat. Off. . |
| 2749665 | 5/1979 | Germany . |

*Primary Examiner*—Khanh Dang
*Attorney, Agent, or Firm*—Cushman Darby & Cushman, L.L.P.

[57] ABSTRACT

A low noise hose including a hollow cylindrical sound absorption member made of soft foam material, a synthetic resin net and/or a spiral wire therein, and a sound insulation tube that is made of soft rubber and has a bellow-like shape disposed about the sound absorption member. The sound insulation tube intercepts the hose internal noise, and it is thicker than a conventional hose so that it is resilient to heat, oil or gas. The sound insulation tube has a bellow-like shape so that it shrinks following the pulsation of intake air, and absorbs it.

7 Claims, 9 Drawing Sheets

5,548,093

LOW NOISE HOSE

The priority application, Japanese Patent Application No. Hei 5-228209, filed in Japan on Aug. 20, 1993 is hereby incorporated hereinto by this reference.

BACKGROUND OF THE INVENTION

1. Field of the Invention

The present invention relates to a hose, and more particularly, a low noise hose used in an intake air system of an internal combustion engine.

2. Description of Related Art

Conventional low noise hoses are described in EP Patent No. 0,318,636 B1 and German Patent No. 2,749,665.

FIG. 14 shows such a conventional low noise hose 51 that is of multi-layered construction, consisting of spiral wire 52 used for an anti-shrinkage member, a synthetic resin net 53, a cylindrical sound absorption member 54 and a synthetic resin skin 55, sequentially from inside, and side members 56 engaged on both sides of the low noise hose 51. The sound absorption member 54 is made of soft foam material of synthetic resin, and the cell of the foam is connected to the next one. The hose internal noise can be reduced by the sound absorption material 54.

However, since the synthetic resin skin 55 is a film having a thickness less than 0.1 mm, internal noise passing through the sound absorption material 54 is leaked to the external portion of the hose without being absorbed in the synthetic resin skin 55. Further, since the synthetic resin skin 55 is thin and easily damaged by heat, oil, or gas or the like, there are some problems regarding durability when used in severe circumstances such as in an engine room. The synthetic resin skin 55 is used since the low noise hose 51 can be assembled freely and can be shrunk to absorb the pulsation of intake air. If thick synthetic resin skin 55 is used, the silencing effect can be increased, however, the low noise hose 51 can not be assembled freely, and can not absorb the pulsation of intake air.

SUMMARY OF THE INVENTION

It is an object of the present invention to provide a low noise hose that reduces hose internal noise so as to be silenced at the external portion of the hose.

Another object of the present invention is to provide a durable hose that is resilient to heat, oil or gas.

A further object of the present invention is to provide a hose that absorbs the pulsation of intake air, and is assembled freely and easily.

To achieve the foregoing objects, the low noise hose has a hollow cylindrical sound absorption member, a sound insulation tube that covers an outer periphery of the cylindrical sound absorption member, a synthetic resin net, a spiral wire and a side member. The sound insulation tube is made of soft polymer material, and has a wave-shape in cross-section. Foam made of rubber or synthetic resin, or in inorganic fiber member, such as glass fiber, may be used for the sound absorption material. When the low noise hose is assembled to an intake air system that is of the exhaust gas reflux type, the sound absorption member is preferably made of oil resistance material so as not to be deteriorated by oil in exhaust gas. When the sound absorption member is to be easily shrunk by negative pressure, it is preferable that the sound absorption member is fixed to the sound insulation tube outer periphery thereof by bonding or welding, or a ventilated anti-shrinkage member is provided at the inner periphery of the sound absorption member. A spiral member or a net member made of synthetic resin or metal (synthetic resin net, metal mesh or the like) may be used for the anti-shrinkage member. When the inorganic fiber member is used for the sound absorption member, it is preferable that the net member is provided inside thereof to prevent the fiber from scattering.

The soft polymer material that forms the sound insulation tube is preferably soft rubber or synthetic resin that is deformed easily, and the wave shaped cross-section includes a bellow shaped or star shaped section. The shape of the outer sound insulation member provided on the hose outer periphery may be tubular or sectoral in cross section, and may include an inner sound insulation member provided in the hose on the radius or the center of the hose.

Since the sound insulation tube covers the outer periphery of the sound absorption member, the hose internal noise passing through the sound absorption member is intercepted in the sound insulation tube, and it is prevented from substantially leaking to the external portion of the hose. Further, since the sound insulation tube is thicker than the conventional synthetic resin skin, it is more resistant to heat, oil or gas. In addition, the sound insulation tube made of soft polymer material has a bellow-like shape in cross-section, it shrinks following the pulsation of intake air, and can absorb the pulsation, be bent freely with flexibility and can be assembled easily.

Other objects, features, and characteristics of the present invention, as well as the method of operation and functions of the related elements of the structure, and the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE INVENTION

Figure 1:
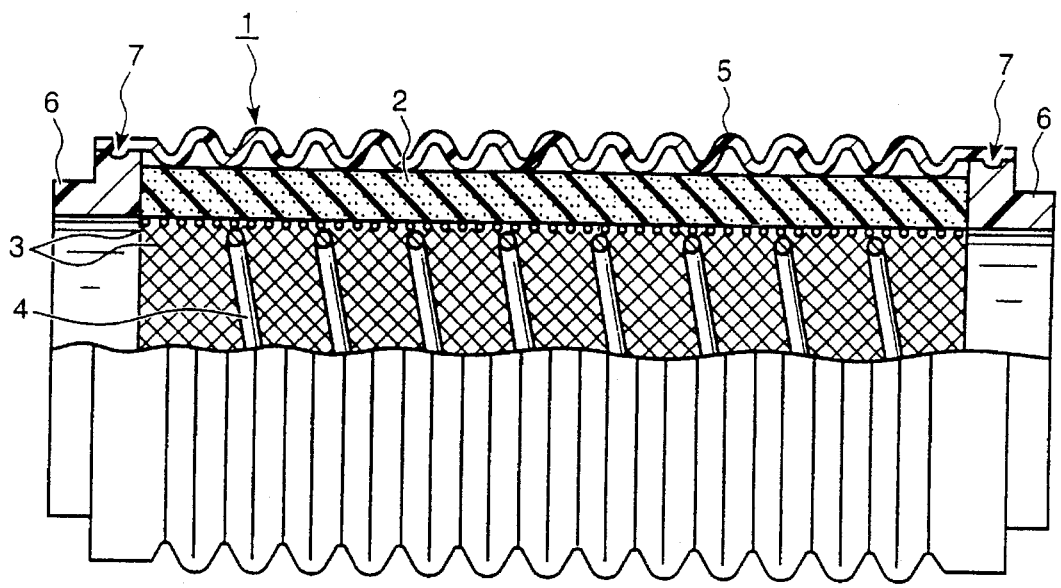
FIG. 1 is a front view, partially in section, of a low noise hose according to the first embodiment of the present invention.
Figure 2:
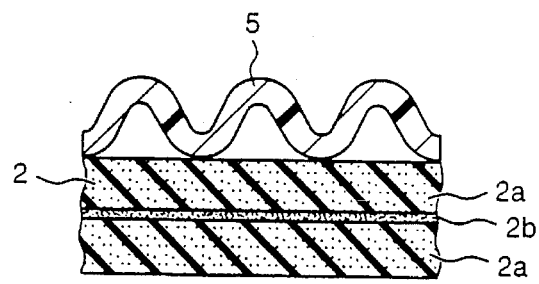
FIG. 2 is a partial cross-sectional view of the test example 1 of the low noise hose according to the first embodiment of the present invention.
Figure 3:
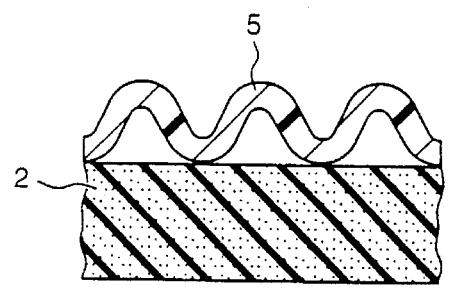
FIG. 3 is a partial cross-sectional view of the test example 2 of the low noise hose according to the first embodiment of the present invention.

FIGS. 1 to 3 illustrate a first embodiment of the present invention, which will be described in detail hereinafter.

The low noise hose 1 has a hollow cylindrical sound absorption member 2 made of a soft foam material such as synthetic resin or rubber. The size of the sound absorption member 2 is as follows:

| | |
|---|---|
| Outer diameter | 100 mm |
| Inner diameter | 70 mm |
| Thickness | 15 mm |
| Length | 180 mm |

The outer periphery of the sound absorption member 2 may be formed in bellow shape to fit an inner periphery of a sound insulation tube 5, having a bellow or wave shape. A synthetic resin net 3, used as an anti-shrinkage member for the sound absorption member 2, is disposed on the inner periphery of the sound absorption member 2, and a spiral wire 4, used for an anti-shrinkage member, is provided on the inner periphery of the synthetic resin net 3. There is no requirement to use both the synthetic resin net 3 and the spiral wire 4.

The sound insulation tube 5, made of soft rubber and having a bellow or wave shape, is provided to be contacted with the outer periphery of the sound absorption member 2. The sound insulation tube 5 is made by blow molding, and its material, configuration and size are selected to obtain the strength that is needed for preserving the configuration and the flexibility in the axis core direction. The size of tube 5 is as follows:

| | |
|---|---|
| Maximum outside diameter | 125 mm |
| Minimum inside diameter | 100 mm |
| Thickness | 3.5 mm |

A side member 6 is inserted into the inner periphery of each end of the sound insulation tube 5, and each member 6 is engaged by a projecting portion, which engages a hollow portion 7 formed in each member 6.

Figure 4:
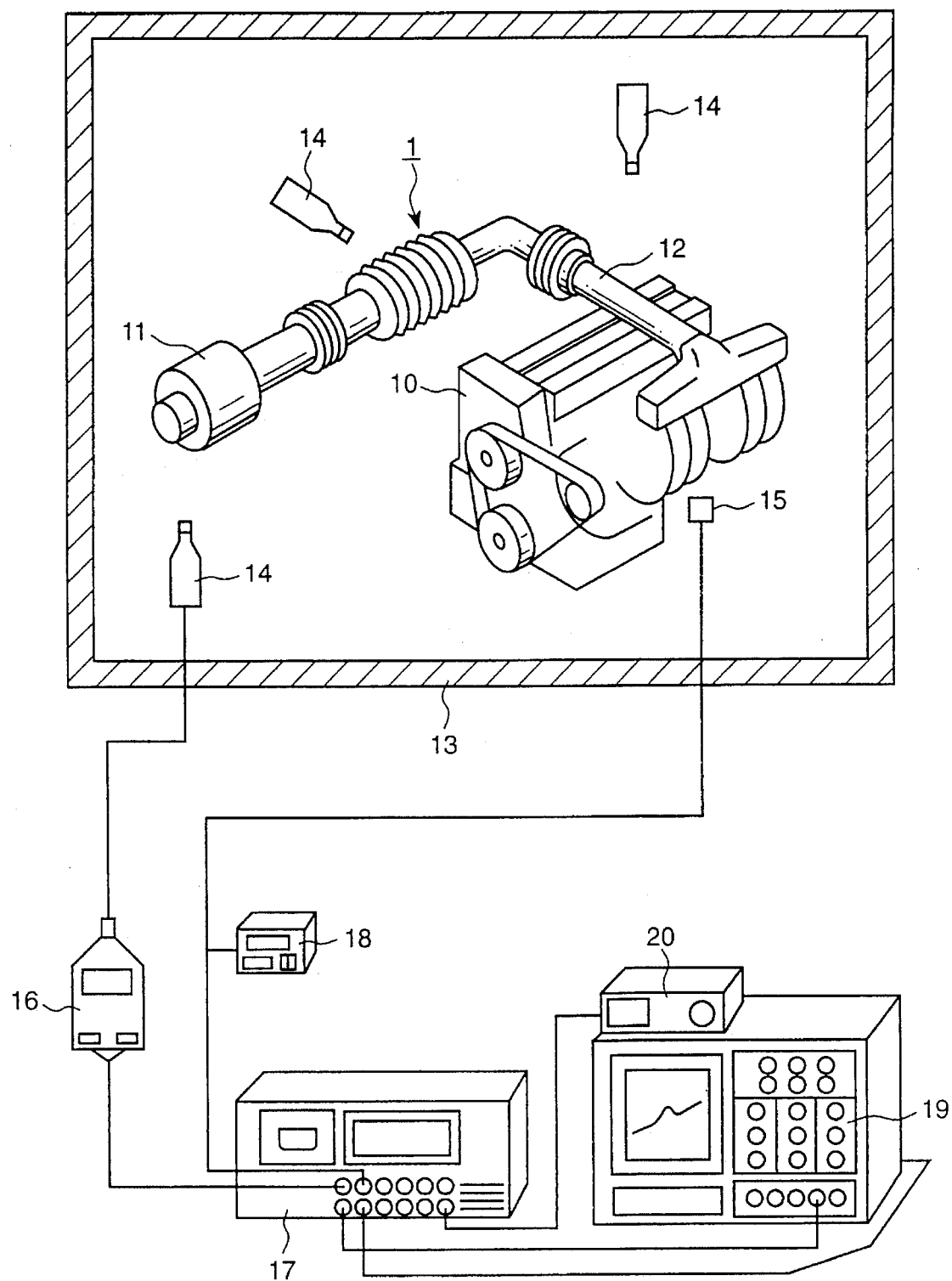
FIG. 4 is a perspective view of the low noise hose coupled to an internal combustion engine and arranged with respect to silencing test equipment.

As shown in FIG. 4, the low noise hose 1 is fixed between an air cleaner 11 and an intake air connector 12 in an intake air system of an internal combustion engine 20, or fixed to an air sucking side of the air cleaner 11.

By providing the sound insulation tube 5 on the outer periphery of the sound absorption member 2, the hose internal noise that passes through the sound absorption member 2, is intercepted in the sound insulation tube 5 so that it is difficult to be leaked to the external portion of the hose. Therefore, the hose internal noise can be reduced, and the silencing effect can be increased. Since the sound insulation tube 5 is thick and resistant to heat, oil or gas, the durability thereof is increased and it may be used in the severe circumstances, such as in an engine room. Further, since the sound insulation tube 5 is formed in bellow shape by soft rubber, it shrinks following pulsation of intake air with the sound absorption member 2, the synthetic resin net 3 and the spiral wire 4. Therefore, tube 5 absorbs the pulsation, maintains its flexibility, and is bent freely and easily.

A silencing test to examine the silencing effect of the hose and its results, Text example 1, Test example 2 of the low noise hose according to the first embodiment, in comparison to a conventional example and a reference example will be described hereinafter.

Test example 1: As shown in FIG. 2, using the low noise hose of which the sound absorption member 2 (thickness: 15 mm) has two soft foam members 2a (thickness: 7.5 mm) made of urethane resin and each soft foam member 2a is bonded to each other by bonding-material 2b. Since this test requires a short time period, and the sound absorption member 2 does not shrink substantially, the synthetic resin net 3 and the spiral wire 4 are not used.

Text example 2: As shown in FIG. 3, using the hose of which the sound absorption member 2 (thickness 15 mm) is made of soft foam member of EPDM (Ethylene Propylene Diene Rubber). The synthetic resin net 3 and the spiral wire 4 are not used.

Figure 14:
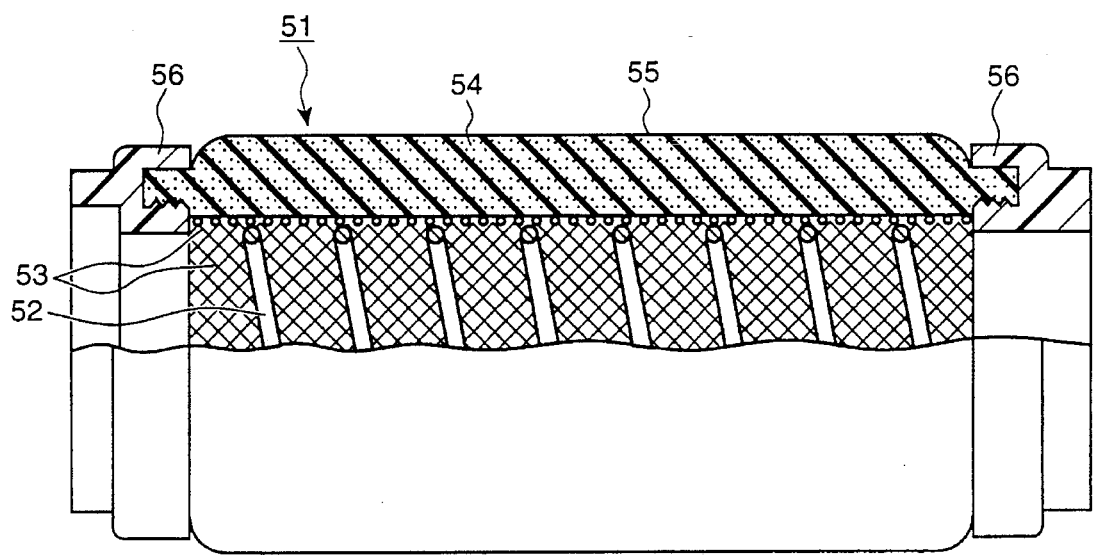
FIG. 14 is a front view of a conventional low noise hose.

Conventional example: As shown in FIG. 14, using the low noise hose 51 of which the sound absorption material 54 has a 100 mm outer diameter, 70 mm inner diameter, 15 mm thickness and 210 mm length, and the thickness of synthetic resin skin 55 is less than 0.1 mm.

Reference example: using a simple rubber hose that has no sound absorption material, and has an 80 mm outer diameter, 70 mm inner diameter, 5mm thickness, 280 mm length.

Each hose of the above examples is fixed to the intake air system of the internal combustion engine, and is disposed in turn within the no resonance room 13. Microphones 14 are provided at a distance of approximately 300 mm from the front side of the air cleaner 11 and from the side of the low noise hose 1 or rubber hose, and at a distance of approximately 1000 mm from the upper side of the internal combustion engine 10. An engine-speed sensor 15 that detects the engine-speed is fixed to the internal combustion engine 10. Each microphone 14 is connected to an input terminal of a data recorder 17 through a sound level meter 16, and the engine-speed sensor 15 is connected to an input terminal of the data recorder 17 through a revolution counter 18. A FFT (Fast Fourier Transform) analyzer 19 and an oscilloscope 20 are connected to an output terminal of the data recorder 17.

The internal combustion engine 10 is operated by changing its engine-speed from 1000 to 6000 RPM (Revolutions Per Minute), and the engine-speed is detected by the engine-speed sensor 15. The noise levels at the air cleaner front position, at the hose side position, and at the upper position of the internal combustion engine are picked up by the microphone 14, and are is recorded by the data recorder 17.

FIGS. 5(a)–5(c), FIGS. 6(a)–6(c) and FIGS. 7(a)–7(c) show text results of the recorded data analyzed by FFT analyzer 19.

Figure 5A:
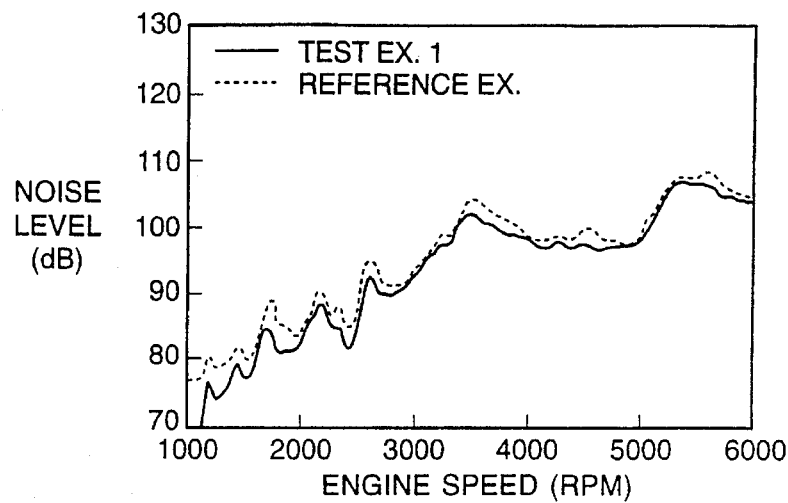
FIGS. 5(a)–5(c) are diagrammatic charts of test results at the front side of an air cleaner.
Figure 5B:
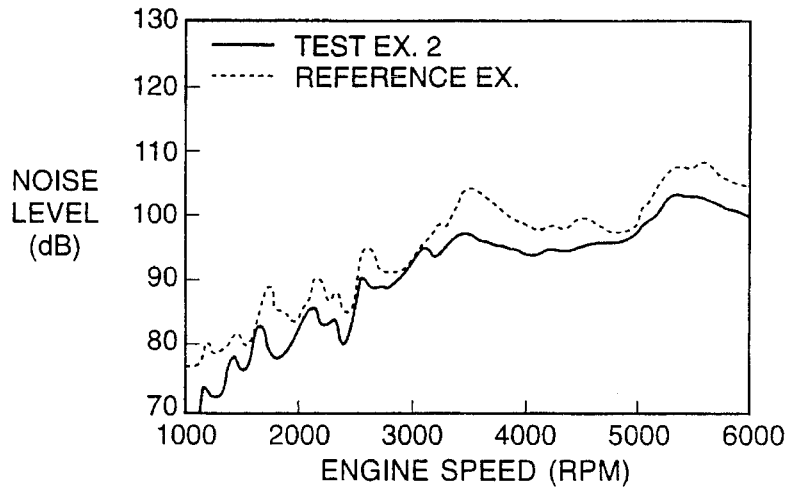
Figure 5C:
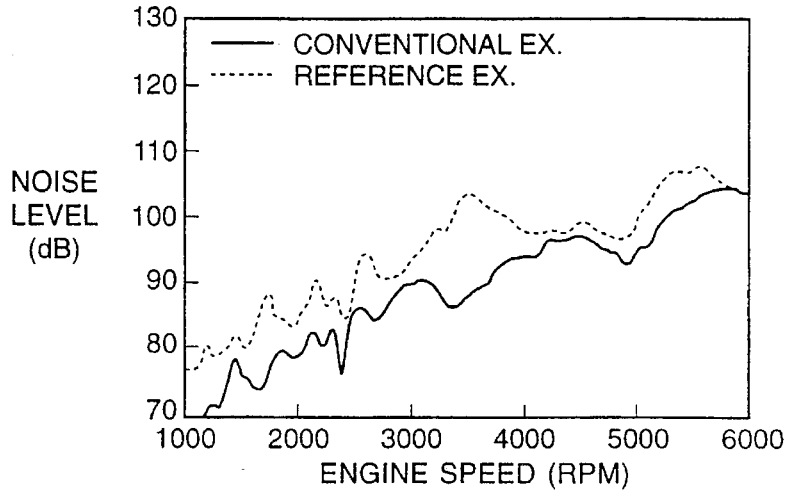

FIGS. 5(a)–5(c) show a noise level at each engine-speed at the air cleaner front position, and FIG. 5(a) shows a test result that contrasts the test example 1 and the reference example, FIG. 5(b) shows a test result that contrasts the test example 2 and the reference example, and FIG. 5(c) shows a test result that contrasts the conventional example and the reference example. The test example 1, the test example 2 and the conventional example obtain a silencing effect at all engine-speeds, and the noise level of the test example 1 is reduced 1–4 dB, that of the test example 2 is reduced 1–7 dB, and that of the conventional example reduced 1–15 dB with respect to the reference example.

Figure 6A:
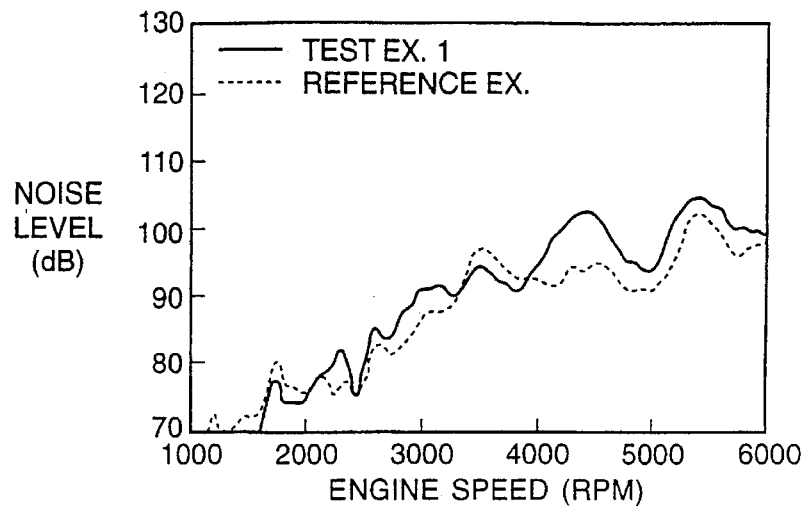
FIGS. 6(a)–6(c) are diagrammatic charts of test results at the side portion of the hose.
Figure 6B:
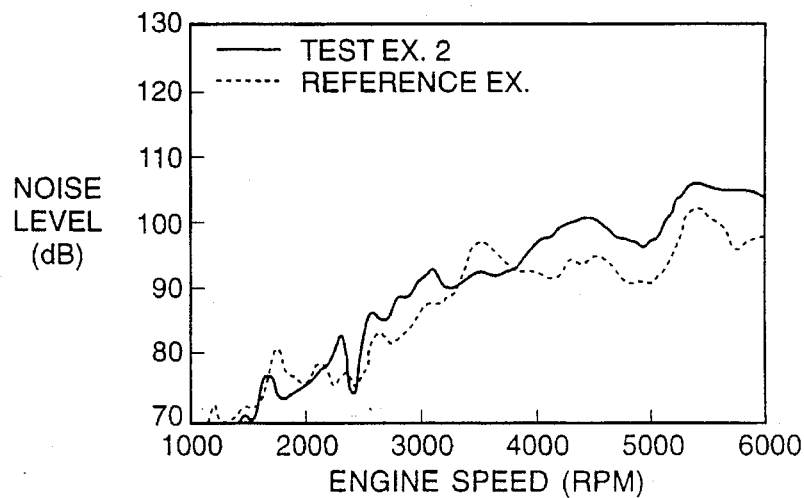
Figure 6C:
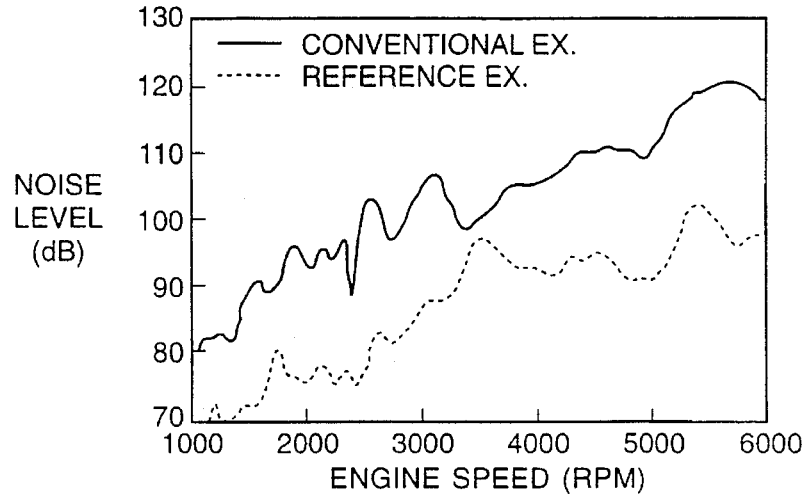

FIGS. 6(a)–6(c) show a noise level at each engine-speed at the hose side position, and FIG. 6(a) shows a test result that contrasts the test example 1 and the reference example, FIG. 6(b) shows a test result that contrasts the test example 2 and the reference example, and FIG. 6(c) shows a test result that contrasts the conventional example and the reference example. The noise level of the conventional example raises 2–25 dB to that of the reference example however, that of the test example 1 and the test example 2 is substantially the same or is slightly greater than that of the reference example.

Figure 7A:
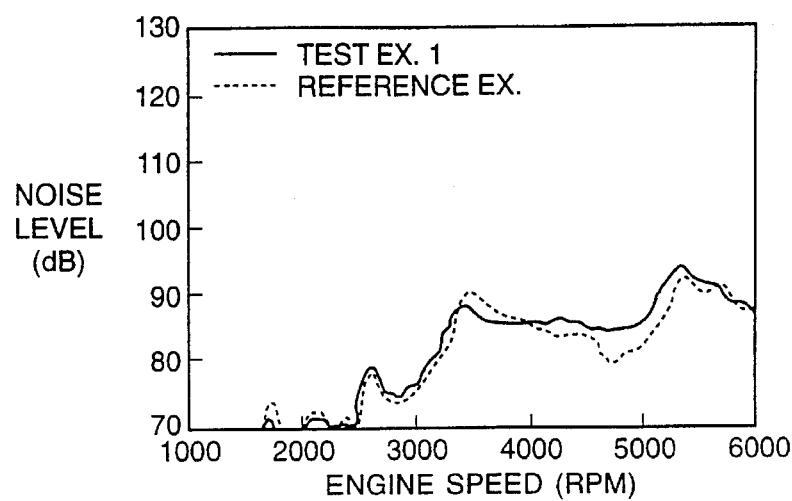
FIGS. 7(a)–7(c) are diagrammatic charts of test results at the upper position of the internal combustion engine.
Figure 7B:
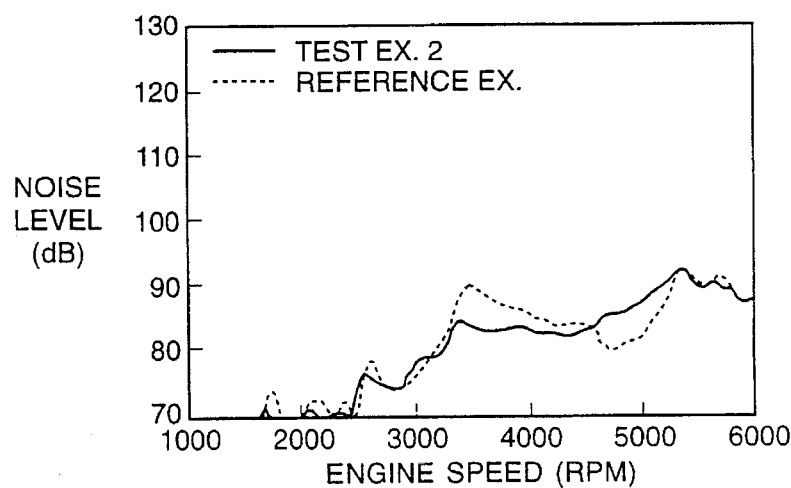
Figure 7C:
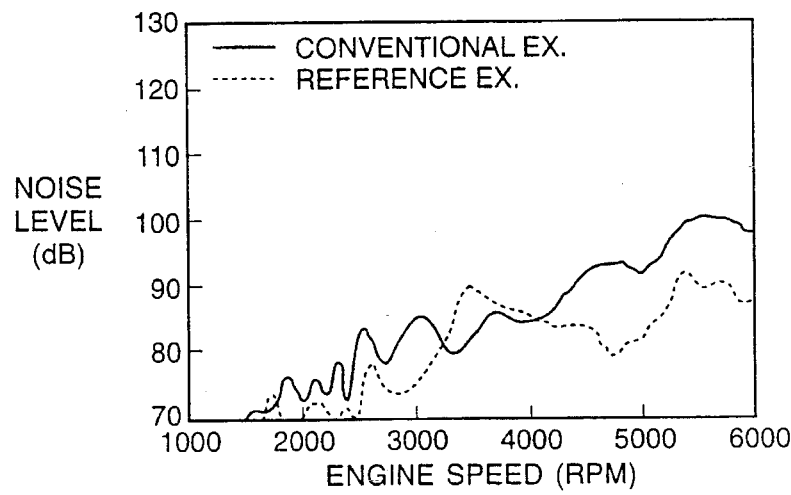

FIGS. 7(a)–7(c) show a noise level at each engine-speed at the internal combustion engine hose upper position, and FIG. 7(a) shows a test result that contrasts the test example 1 and the reference example. FIG. 7(b) shows a test result that contrasts the test example 2 and the reference example, and FIG. (c) shows a test result that contrasts the conventional example and the reference example. The noise level of the conventional example raises 15 dB, maximum, to the reference example, however, the noise level of the test example 1 and test example 2 is almost the same as that of the reference example.

It can be seen that the test example 1 and the test example 2 of this embodiment having sound insulation to be 5 has a greater silencing effect than the conventional example.

Figure 8:
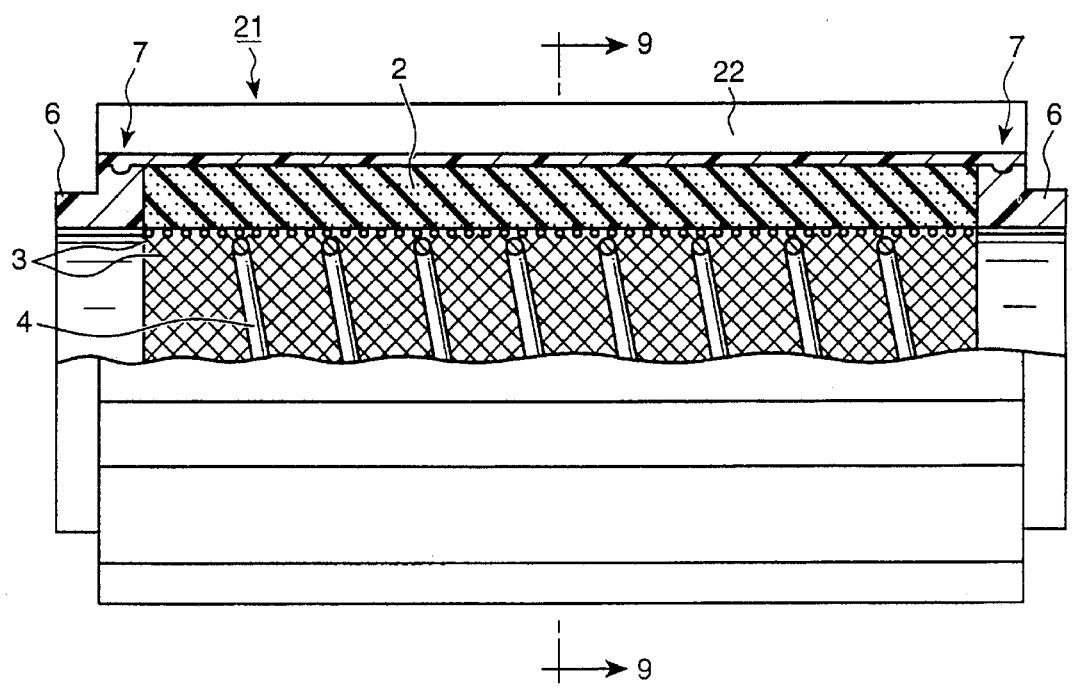
FIG. 8 is a front view, partially in section, of the low noise hose according to a second embodiment of the present invention.
Figure 9:
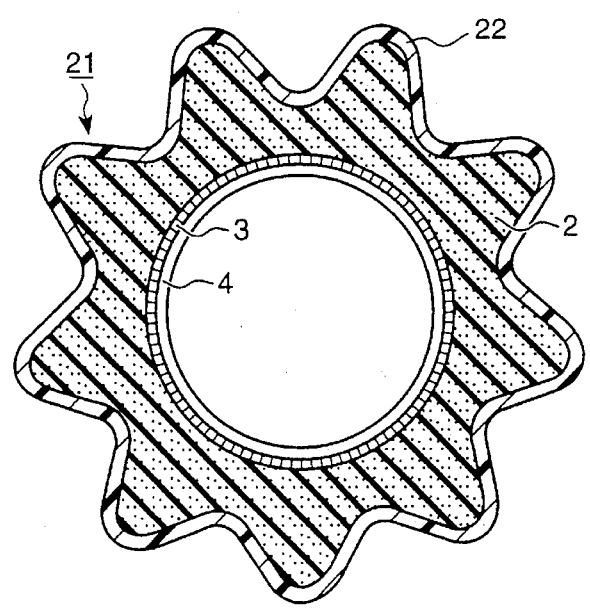
FIG. 9 is a cross-sectional view of the low noise hose taken along the line 9—9 of FIG. 8.

FIGS. 8 and 9 illustrate a second embodiment of the present invention, which will be described in detail hereinafter.

A low noise hose 21 has a sound insulation tube 22 that is made of soft synthetic resin and has a star-shaped section and is disposed over an outer periphery of the sound absorption member 2. Other parts and their numbers are same as the first embodiment.

The low noise hose 21 increases the silencing effect and the durability as in the first embodiment, and since the sound insulation tube 22 has a star-shaped section, it shrinks following the pulsation of the intake air in the radial direction of the sound absorption member 2, and absorbs the pulsation. Further, since the sound insulation tube 22 is made of soft rubber, it has a flexibility, and can be bent.

Figure 10:
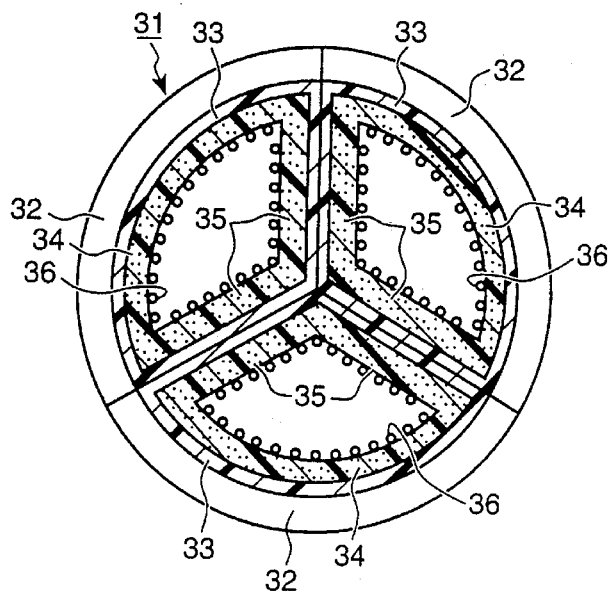
FIG. 10 is a cross-sectional view of the low noise hose according to a third embodiment of the present invention.
Figure 11:
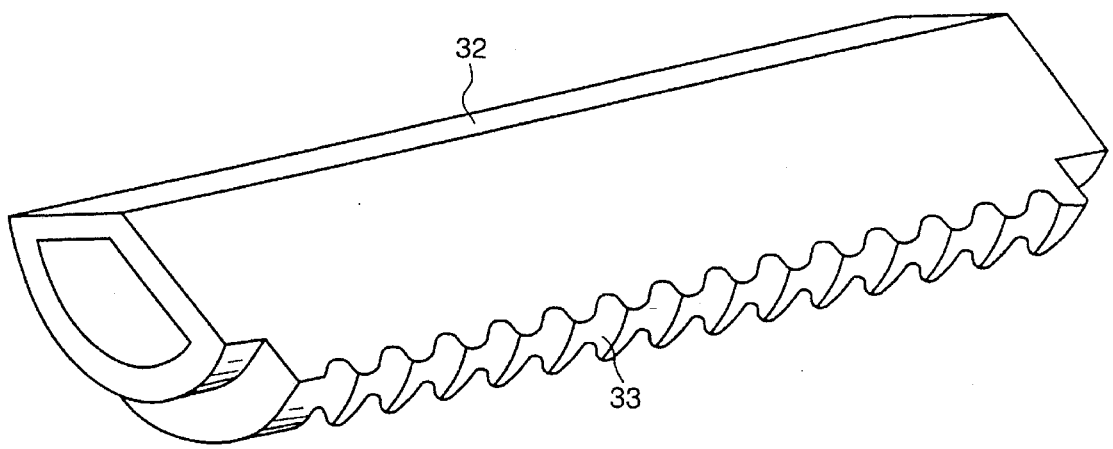
FIG. 11 is a perspective view of a hose element of the low noise hose according to the third embodiment of the present invention.
Figure 12:
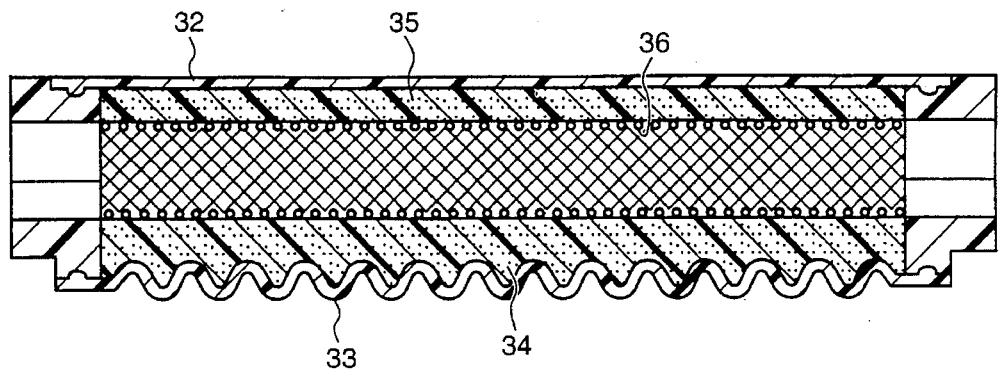
FIG. 12 is a cross-sectional view of the hose element of FIG. 11.

FIGS. 10 to 12 illustrate a third embodiment of the present invention, which will be described in detail hereinafter.

A low noise hose 31 comprises three hose element 32 corresponding to 120 degree intervals with respect to a center of the hose 31. Each hose element 32 has a sound insulation tube 33 that is made of soft rubber and has a sector shape in section. The tube 33 is formed in bellow-like shape. The sound insulation tube 33 has a circumferential sound insulation member 34 that is disposed on the inner periphery of the tube 33, and the radial insulation member 35 that is disposed on the radial periphery of the tube 33. Each insulation member 34, 35 is made of soft foam material of urethane resin. A metal mesh 36 used as an anti-shrinkage member is provided on the inner periphery of the sound absorption members 34, 35. Other parts and their numbers are the same as in the first embodiment.

The low noise hose 31 increases the silencing effect and the durability as in the first embodiment, and absorbs the pulsation of the intake air, and increases the ease of assembly. Further, the silencing effect is increased by providing the inner sound insulation member 35 with an increased surface area and volume due to its construction.

Figure 13:
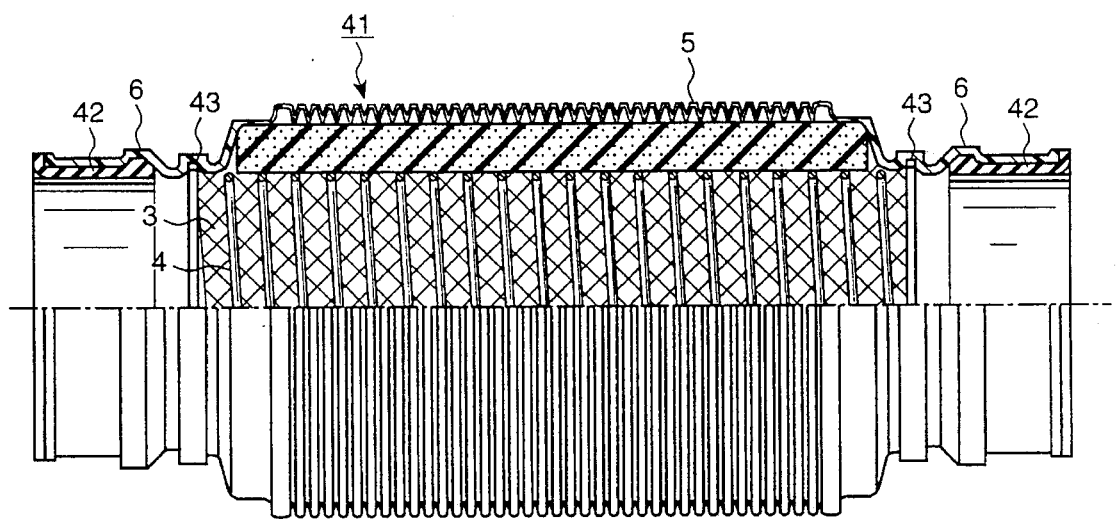
FIG. 13 is a front view, partially in section, of the low noise hose according to the second embodiment of the present invention.

FIG. 13 illustrates a fourth embodiment of the present invention, which will be described in detail hereinafter.

A low noise hose 41 has a side member 6 and a sound insulation tube 5 that are formed by blow molding in one body. A sealing member 42 is provided inside the side member 6, and a fixing portion 43 is provided at both ends of the spiral wire 4 so as to fix the spiral wire 4 with respect to side member 6. Other parts and their numbers are the same as in the first embodiment.

The low noise hose 41 increases the silencing effect and the durability as in the first embodiment, and the side member 6 and the sound insulation tube 5 is made in one body so that it is easy to manufacture. Further, the manufacturing cost is decreased by the reduction of parts, and the hose 41 need not be sealed, and the noise is difficult to be leaked to the hose periphery. Besides, by providing the fixing portion 43, the spiral wire 4 is maintained in position and even if there is some error in sizing of parts, the wire 4 may be fitted to the hose body.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A low noise hose comprising:

a hollow cylindrical sound absorption member made from a foamed material;

a sound insulation tube covering an outer periphery of said sound absorption member, said insulation tube having at least portions thereof spaced outwardly from said sound absorption member so as to define a plurality of air spaces therebetween at such spaced portions; and a net provided on an inner periphery of said sound absorption member for preventing shrinkage of the sound absorption member.

2. A low noise hose according to claim 1, wherein said net is made of synthetic resin.

3. A low noise hose according to claim 1, wherein said sound insulation tube is made by blow molding soft polymer into a bellows-like configuration defined by a series of repeating ridges and grooves.

4. A low noise hose according to claim 3, wherein said soft polymer is rubber.

5. A low noise hose according to claim 3, wherein said soft polymer is synthetic resin.

6. A low noise hose according to claim 3, further comprising a side member disposed within each end of said insulation tube, each end of said insulation tube including a projection, each said side member including a recess for engaging said projection of said sound insulation tube.

7. A low noise hose comprising:

a hollow cylindrical sound absorption member made of soft foamed material;

a sound insulation tube provided about an outer periphery of said sound absorption member so that a series of air gaps are defined along a length of said hose between said sound absorption member and said sound insulation tube;

a synthetic resin net disposed on an inner periphery of said sound absorption member; and a spiral wire provided on an inner periphery of said synthetic resin net for preventing shrinkage of said sound absorption member.

\* \* \* \* \*